(12) United States Patent
Kimura et al.

(10) Patent No.: US 9,545,944 B2
(45) Date of Patent: Jan. 17, 2017

(54) STEERING APPARATUS AND STEERING CONTROLLER

(71) Applicant: TOYOTA JIDOSHA KABUSHIKI KAISHA, Toyota-shi, Aichi-ken (JP)

(72) Inventors: Yukihide Kimura, Gotenba (JP); Takeshi Goto, Toyota (JP); Yoji Kunihiro, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/916,232

(22) PCT Filed: Sep. 3, 2014

(86) PCT No.: PCT/IB2014/001686
§ 371 (c)(1),
(2) Date: Mar. 3, 2016

(87) PCT Pub. No.: WO2015/033203
PCT Pub. Date: Mar. 12, 2015

(65) Prior Publication Data
US 2016/0200354 A1   Jul. 14, 2016

(30) Foreign Application Priority Data
Sep. 4, 2013  (JP) ................. 2013-183384

(51) Int. Cl.
*B62D 5/04*   (2006.01)
(52) U.S. Cl.
CPC ........... *B62D 5/0463* (2013.01); *B62D 5/0472* (2013.01)
(58) Field of Classification Search
CPC ............................ B62D 5/0463; B62D 5/0472
See application file for complete search history.

(56) References Cited

U.S. PATENT DOCUMENTS

| 7,913,804 B2 | 3/2011 | Ehara et al. |
| 2003/0069675 A1 | 4/2003 | Kifuku et al. |

(Continued)

FOREIGN PATENT DOCUMENTS

| DE | 102012219260 A1 | 5/2013 |
| JP | 5-85379 A | 4/1993 |

(Continued)

OTHER PUBLICATIONS

Communication from United States Patent and Trademark Office issued Jul. 28, 2016 in U.S. Appl. No. 14/432,086.

*Primary Examiner* — Aaron L Troost
(74) *Attorney, Agent, or Firm* — Sughrue Mion, PLLC

(57) ABSTRACT

A controller of a steering apparatus includes a calculating unit that calculates a correction assistance quantity based on a steering angular velocity coefficient and a torque coefficient, a steering angular velocity coefficient setting unit that sets the steering angular velocity coefficient depending on a steering angular velocity and that sets the steering angular velocity coefficient to become larger as a feedback quantity of a negative feedback unit becomes larger, and a torque coefficient setting unit that sets the torque coefficient depending on a steering torque and that sets the torque coefficient to become larger as the feedback quantity of the negative feedback unit becomes larger. The feedback quantity of the torque coefficient setting unit when the steering torque is in a predetermined high-frequency range is larger than the feedback quantity of the steering angular velocity coefficient setting unit when the steering angular velocity is in a predetermined high-frequency range.

8 Claims, 10 Drawing Sheets

(56) References Cited

U.S. PATENT DOCUMENTS

| | | | |
|---|---|---|---|
| 2007/0062755 A1* | 3/2007 | Krieger | B62D 5/0472 180/446 |
| 2015/0266501 A1 | 9/2015 | Kojo et al. | |
| 2015/0266504 A1 | 9/2015 | Kunihiro et al. | |
| 2015/0274201 A1 | 10/2015 | Kunihiro et al. | |

FOREIGN PATENT DOCUMENTS

| | | |
|---|---|---|
| JP | 7-40756 A | 2/1995 |
| JP | 8-99647 A | 4/1996 |
| JP | 2003-63437 A | 3/2003 |
| JP | 2004-17881 A | 1/2004 |
| JP | 2004175122 A | 6/2004 |
| JP | 2005088754 A | 4/2005 |
| JP | 2009262652 A | 11/2009 |
| JP | 2010-111361 A | 5/2010 |
| JP | 2012126359 A | 7/2012 |

* cited by examiner

F I G . 8
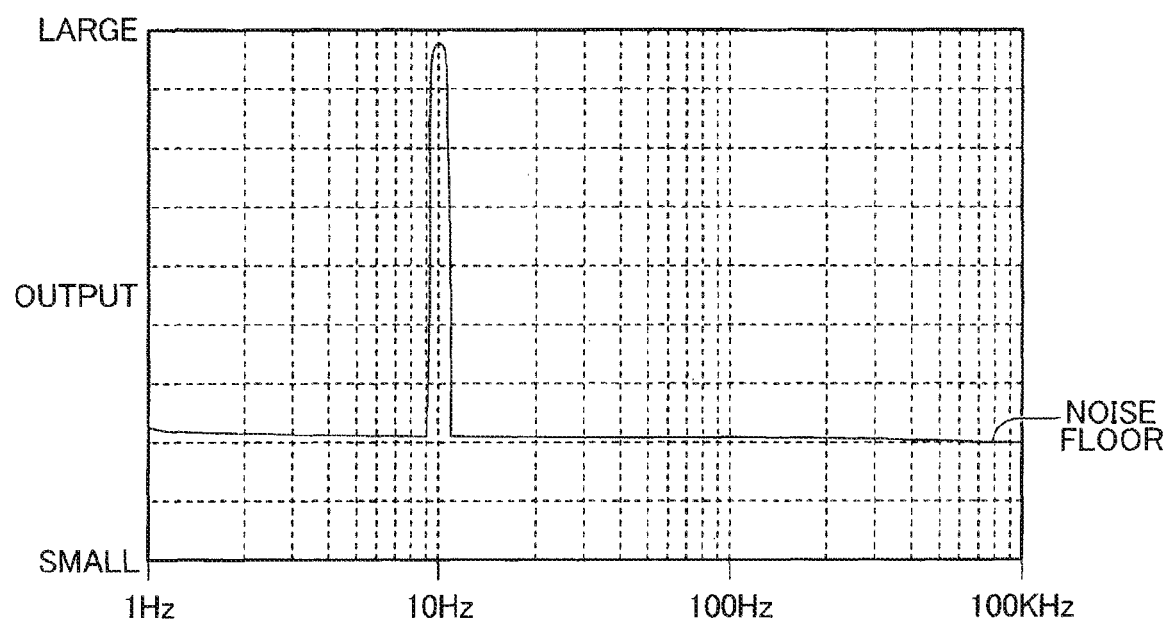

STEERING APPARATUS AND STEERING CONTROLLER

CROSS REFERENCE TO RELATED APPLICATIONS

This application is a National Stage of International Application No. PCT/IB2014/001686 filed Sep. 3, 2014, claiming priority based on Japanese Patent Application No. 2013-183384 filed Sep. 4, 2013, the contents of all of which are incorporated herein by reference in their entirety.

BACKGROUND OF THE INVENTION

1. Field of the Invention

The present invention relates to a steering apparatus and a steering controller.

2. Description of Related Art

As a steering apparatus and a steering controller mounted in a vehicle, for example, a lane-following running controller is disclosed in Japanese Patent Application Publication No. 2003-063437 (JP 2003-063437 A). The lane-following running controller estimates a state quantity including at least a disturbance torque applied to a steering apparatus on the basis of a running lane and a running state of the vehicle, feeds the estimated state quantity back to calculate a command torque, and generates a steering torque corresponding to the command torque. At this time, the lane-following running controller separately estimates the disturbance torque as a high-frequency component and a low-frequency component and sets the feedback quantity of the high-frequency component of the estimated disturbance torque to be smaller than the feedback quantity of the low-frequency component.

In the lane-following running controller described in JP 2003-063437 A, a driver's steering input can be easily reflected, for example, by setting the feedback quantity of the high-frequency component to be relatively small. However, inversely, a variation in torque due to disturbance of the high-frequency component increases and tends to be unstable and thus there is room for improvement in terms of improvement of a steering sensation.

SUMMARY OF THE INVENTION

The present invention provides a steering apparatus and a steering controller that can improve a steering sensation felt by a driver.

A steering apparatus according to a first aspect of the invention includes: a steering member that turns turning wheels of a vehicle; an actuator that assists an operation of the steering member; a steering angle detector that detects a steering angle of the steering member; a torque detector that detects a torque acting on a steering shaft unit rotating along with the steering member; and a steering controller that includes a steering angular velocity coefficient setting unit that sets a steering angular velocity coefficient on the basis of a steering angular velocity which is a speed of the steering angle detected by the steering angle detector, that includes a first negative feedback unit, and that sets the steering angular velocity coefficient for the steering angular velocity having the same magnitude to become larger as a feedback quantity of the first negative feedback unit becomes larger, a torque coefficient setting unit that sets a torque coefficient on the basis of the torque detected by the torque detector, that includes a second negative feedback unit, that sets the torque coefficient for the torque having the same magnitude to become larger as a feedback quantity of the second negative feedback unit becomes larger, and that sets a feedback quantity of the torque coefficient setting unit when the torque is in a predetermined high-frequency range to become larger than a feedback quantity of the steering angular velocity coefficient setting unit when the steering angular velocity is in a predetermined high-frequency range, and a correction assistance quantity calculating unit that calculates the correction assistance quantity on the basis of the steering angular velocity coefficient and the torque coefficient, wherein the steering controller controls the actuator on the basis of a basic assistance quantity which is an assistance quantity as a basis and the correction assistance quantity.

In the aspect, the steering controller may set the feedback quantity of the steering angular velocity coefficient setting unit when the steering angular velocity is in a predetermined low-frequency range to become larger than the feedback quantity of the torque coefficient setting unit when the torque is in a predetermined low-frequency range.

In the aspect, the steering angular velocity coefficient setting unit may include a first amplifier that amplifies and outputs an input corresponding to the steering angular velocity which is the speed of the steering angle detected by the steering angle detector, a first filter that performs a low-pass filtering process of removing a predetermined high-frequency component of the output of the first amplifier and outputting the resultant as the steering angular velocity coefficient, and a first negative feedback circuit that constitutes the first negative feedback unit and that negatively feeds back the output of the first filter to the input of the first amplifier with a predetermined feedback quantity, and the torque coefficient setting unit may include a second amplifier that amplifies and outputs an input corresponding to the torque detected by the torque detector, a second filter that performs a high-pass filtering process of removing a predetermined low-frequency component of the output of the second amplifier and outputting the resultant as the torque coefficient, and a second negative feedback circuit that constitutes the second negative feedback unit and that negatively feeds back the output of the second filter to the input of the second amplifier with a predetermined feedback quantity.

In the aspect, the correction assistance quantity calculating unit may calculate the correction assistance quantity on the basis of first steering power based on the steering angular velocity coefficient, the torque detected by the torque detector, and the steering angular velocity which is the speed of the steering angle detected by the steering angle detector and second steering power based on the torque coefficient, a differential value of the torque detected by the torque detector, and the steering angle detected by the steering angle detector.

In the aspect, the first steering power may be a value corresponding to a value obtained by dividing the product of the steering angular velocity coefficient, the torque detected by the torque detector, and the steering angular velocity which is the speed of the steering angle detected by the steering angle detector by the absolute value of the torque detected by the torque detector, and, the second steering power may be a value corresponding to a value obtained by dividing the product of the torque coefficient, the differential value of the torque detected by the torque detector, and the steering angle detected by the steering angle detector by the absolute value of the steering angle detected by the steering angle detector.

A steering apparatus according to a second aspect of the invention includes: a steering member that turns turning wheels of a vehicle; an actuator that assists an operation of the steering member; a steering angle detector that detects a steering angle of the steering member; a torque detector that detects a torque acting on a steering shaft unit rotating along with the steering member; and a steering controller that includes a steering angular velocity coefficient setting unit that sets a steering angular velocity coefficient on the basis of a steering angular velocity which is a speed of the steering angle detected by the steering angle detector, a torque coefficient setting unit that sets a torque coefficient on the basis of the torque detected by the torque detector and that sets the torque coefficient when the torque is in a predetermined high-frequency range to become larger than the steering angular velocity coefficient when the steering' angular velocity is in a predetermined high-frequency range, and a correction assistance quantity calculating unit that calculates the correction assistance quantity on the basis of the steering angular velocity coefficient and the torque coefficient, wherein the steering controller controls the actuator on the basis of a basic assistance quantity which is an assistance quantity as a basis and the correction assistance quantity.

A steering apparatus according to a third aspect of the invention includes: a steering member that turns turning wheels of a vehicle; an actuator that assists an operation of the steering member; a steering angle detector that detects a steering angle of the steering member; a torque detector that detects a torque acting on a steering shaft unit rotating along with the steering member; and a steering controller that includes a steering angular velocity coefficient setting unit that includes a first amplifier that amplifies and outputs an input corresponding to the steering angular velocity which is the speed of the steering angle detected by the steering angle detector, a first filter that performs a low-pass filtering process of removing a predetermined high-frequency component of the output of the first amplifier and outputting the resultant as a steering angular velocity coefficient, and a first negative feedback circuit that negatively feeds back the output of the first filter to the input of the first amplifier, and that sets the steering angular velocity coefficient on the basis of a steering angular velocity which is a speed of the steering angle detected by the steering angle detector, a torque coefficient setting unit that includes a second amplifier that amplifies and outputs an input corresponding to the torque detected by the torque detector, a second filter that performs a high-pass filtering process of removing a predetermined low-frequency component of the output of the second amplifier and outputting the resultant as a torque coefficient, and a second negative feedback circuit that negatively feeds back the output of the second filter to the input of the second amplifier, and that sets the torque coefficient on the basis of the torque detected by the torque detector, and a correction assistance quantity calculating unit that calculates the correction assistance quantity on the basis of the steering angular velocity coefficient and the torque coefficient, wherein the steering controller controls the actuator on the basis of a basic assistance quantity which is an assistance quantity as a basis and the correction assistance quantity.

A steering apparatus according to a fourth aspect of the invention includes: a steering member that turns turning wheels of a vehicle; an actuator that assists an operation of the steering member; and a steering controller that includes a correction assistance quantity calculating unit that calculates an correction assistance quantity on the basis of a steering angular velocity coefficient determined depending on a steering angular velocity which is the speed of a steering angle of the steering member and a torque coefficient determined depending on a torque acting on a steering shaft unit rotating along with the steering member, a steering angular velocity coefficient setting unit that sets the steering angular velocity coefficient on the basis of the steering angular velocity, that includes a first negative feedback unit, and that sets the steering angular velocity coefficient for the steering angular velocity having the same magnitude to become larger as a feedback quantity of the first negative feedback unit becomes larger, and a torque coefficient setting unit that sets the torque coefficient on the basis of the torque acting on the steering shaft unit rotating along with the steering member, that includes a second negative feedback unit, that sets the torque coefficient for the torque having the same magnitude to become larger as a feedback quantity of the second negative feedback unit becomes larger, and that sets a feedback quantity of the torque coefficient setting unit when the torque acting on the steering shaft unit rotating along with the steering member is in a predetermined high-frequency range to become larger than a feedback quantity of the steering angular velocity coefficient setting unit when the steering angular velocity is in a predetermined high-frequency-range, wherein the steering controller controls the actuator on the basis of a basic assistance quantity which is an assistance quantity as a basis and the correction assistance quantity.

According to the above-mentioned aspects, it is possible to improve a steering sensation felt by a driver.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 8 is a diagram illustrating an example of an FFT result of the output of the K2 setting unit at the time of inputting of a high-frequency component;

DETAILED DESCRIPTION OF EMBODIMENTS

Hereinafter, an embodiment of the present invention will be described in detail with reference to the accompanying drawings. The invention is not limited to the embodiment. Elements in the following embodiment include elements that can be easily substituted by those skilled in the art or substantially equivalent elements.

Embodiment

Figure 1:
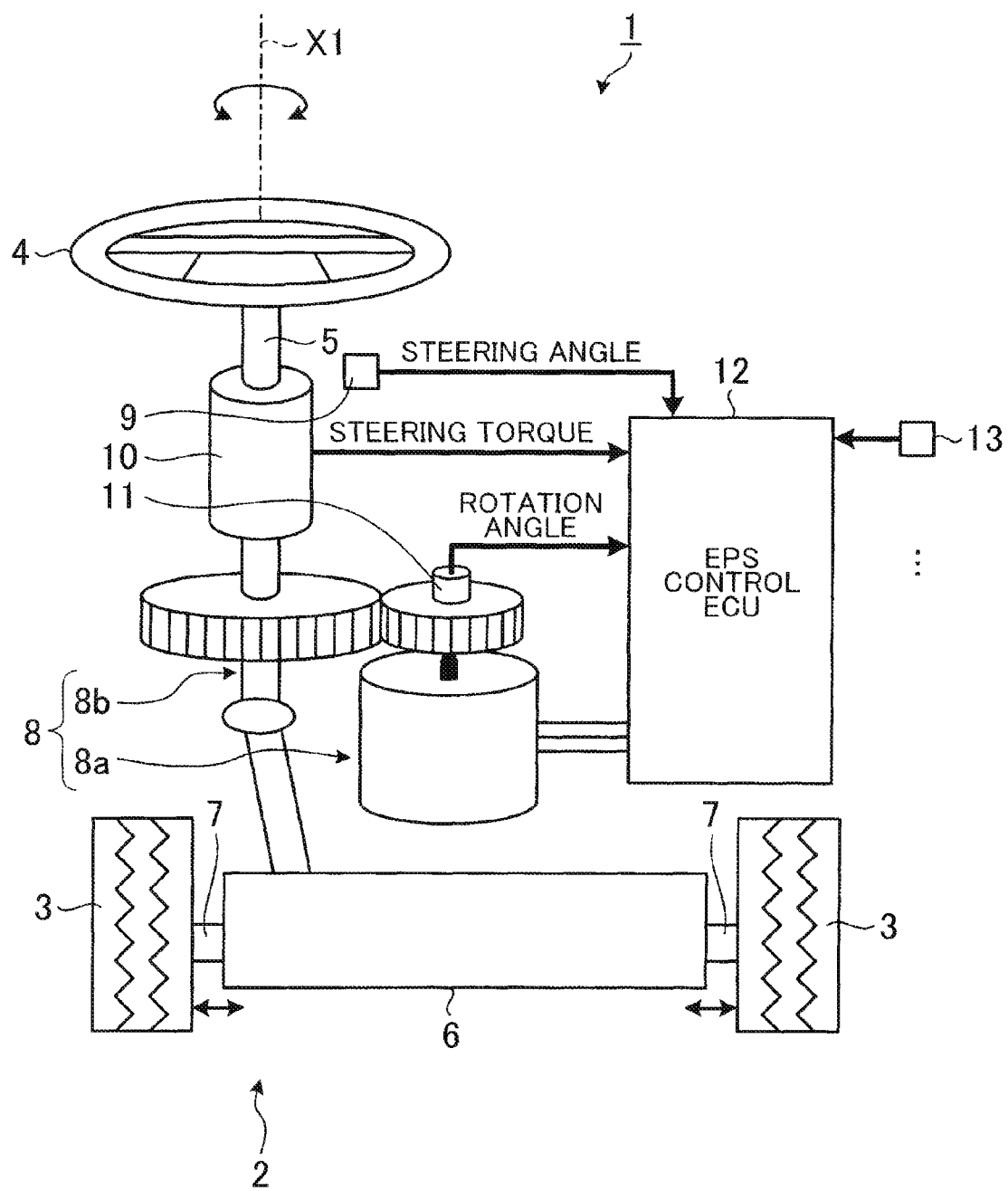
FIG. 1 is a diagram schematically illustrating a configuration of a steering apparatus according to an embodiment.

FIG. 1 is a diagram schematically illustrating a configuration of a steering apparatus according to an embodiment.

The steering apparatus 1 according to this embodiment illustrated in FIG. 1 is a system that is mounted in a vehicle 2 and that is used to steer turning wheels 3 of the vehicle 2. The steering apparatus 1 according to this embodiment constitutes a steering system having plural signals that are perceived by a driver, such as a steering torque MT (steering torque differential value MTdot) and a steering angle MA (steering angular velocity MAdot), as composite inputs. Accordingly, the steering apparatus 1 provides a steering sensation matching with human perception characteristics (for example, perception characteristics that a steering angle MA is input in a low-frequency range and a torque responds to disturbance in a high-frequency range), thereby improving a steering sensation to be felt by a driver.

The steering apparatus 1 according to this embodiment is a so-called electric power steering (EPS) apparatus that assists a steering force of the vehicle 2 with dynamic power of an electric motor or the like. The steering apparatus 1 assists a driver's steering operation (steering operation) by driving an electric motor or the like so as to obtain a steering assist force based on a steering force applied to a steering wheel (hereinafter, abbreviated as "steering" without any particular description) 4 as a steering member from the driver.

The constituent units of the steering apparatus 1 will be specifically described below with reference to FIG. 1. As illustrated in FIG. 1, the steering apparatus 1 includes the steering 4, a steering shaft (hereinafter, abbreviated to "shaft" without any particularly description) 5 as a steering shaft unit, a rack and pinion gear mechanism (hereinafter, abbreviated to "gear mechanism" without any particular description) 6, and a pair of tie rods 7 on the right and left sides. The steering apparatus 1 further includes an EPS unit 8 as an actuator, a steering angle sensor 9 as a steering angle detector, a torque sensor 10 as a torque detector, a rotation angle sensor 11, and an EPS control ECU 12 as a steering controller.

The steering 4 is a member that can be operated to rotate about a rotation axis line X1 and is disposed in a driver seat of the vehicle 2. A driver can perform a steering operation by rotationally operating the steering 4 about the rotation axis line X1.

The shaft 5 constitutes a rotation shaft unit of the steering 4. One end of the shaft 5 is connected to the steering 4 and the other end is connected to the gear mechanism 6. The steering 4 is connected to the gear mechanism 6 via the shaft 5. The shaft 5 can rotate about a center axis line along with the steering 4 by the rotational operation of the steering 4 by the driver. The shaft 5 may be divided into plural shafts such as an upper shaft, an intermediate shaft, and a lower shaft.

The gear mechanism 6 mechanically connects the shaft 5 to the pair of tie rods 7. The gear mechanism 6 includes a so-called rack and pinion type gear mechanism. The gear mechanism 6 converts the rotational movement about the center axis line of the shaft 5 into linear movement in the lateral direction (typically corresponding to the vehicle width direction of the vehicle 2) of the pair of tie rods 7.

A base end of each of the pair of tie rods 7 is connected to the gear mechanism 6 and a tie rod end of each tie rod as a tip is connected to the corresponding turning wheel 3 via a corresponding knuckle arm. The steering 4 is connected to the turning wheels 3 via the shaft 5, the gear mechanism 6, the tie rods 7, and the like.

The EPS unit 8 assists a driver's steering operation of the steering 4 and generates a torque for assisting the steering operation. The EPS unit 8 outputs a steering assist force (assist torque) for assisting a steering force (torque) input to the steering 4 from the driver. The EPS unit 8 assists the driver's steering operation by applying the assist torque to the shaft 5. Here, the assist torque as the steering assist force is a torque for assisting the torque corresponding to the steering force input to the steering 4 from the driver.

The EPS unit 8 includes a motor 8a as an electric motor and a reduction gear 8b. The EPS unit 8 according to this embodiment is a column EPS unit in which the motor 8a is disposed in the shaft 5 such as the intermediate shaft, that is, a so-called column assist type assist mechanism, but the invention is not limited to this configuration.

The motor 8a is a column-assist electric motor that generates a rotational force (motor torque) with a supply of power, and generates, for example, an assist torque as a steering assist force. The motor 8a is connected to the shaft 5 via the reduction gear 8b so as to transmit dynamic power and applies the steering assist force to the shaft 5 via the reduction gear 8b.

In the EPS unit 8, the motor 8a is rotationally driven and the rotational force (torque) generated from the motor 8a is transmitted to the shaft 5 via the reduction gear 8b, whereby the steering assist is performed. At this time, the rotational force generated from the motor 8a is reduced and increased in torque by the reduction gear 8b and is then transmitted to the shaft 5. The EPS unit 8 is electrically connected to the EPS control ECU 12 to be described later so as to control driving of the motor 8a.

The steering angle sensor 9 detects a steering angle (steering wheel steering angle) which is a rotation angle of the steering 4. Here, the steering angle sensor 9 detects the steering angle as an absolute angle. The steering angle detected by the steering angle sensor 9 has a positive value for the left rotation with respect to a neutral position of the steering 4 and has a negative value for the right rotation and vice versa. The neutral position of the steering 4 is a reference position of the steering angle and is typically the position of the steering 4 when the vehicle 2 runs straightly. The steering angel detected by the steering angle sensor 9 is 0° at the neutral position of the steering 4. The steering angle sensor 9 is electrically connected to the EPS control ECU 12 and outputs a detection signal corresponding to the detected steering angle to the EPS control ECU 12.

The steering angle detector of the steering apparatus 1 is not limited to the steering angle sensor 9, but may employ, for example, a rotation angle sensor 11 that detects the rotation angle of a rotor shaft of the motor 8a and a sensor (not illustrated) that detects a rack stroke or a pinion rotation angle of the gear mechanism 6. In this case, when the steering angle detector is a sensor that detects the steering angle as a relative angle, such as a rotation angle sensor 11, the steering angle detector only has to have a particular function that acquires the absolute angle of the steering 4.

The torque sensor 10 detects a torque acting on the shaft 5. The torque sensor 10 detects, for example, a torque acting on a torsion bar (not illustrated) as a torsion member constituting a part of the EPS unit 8. The torque (hereinafter, referred to as "steering torque" without any particular description) detected by the torque sensor 10 is a torque in consideration of a driver steering torque acting on the shaft 5 due to the steering force input to the steering 4 from the driver, a disturbance torque input to the shaft 5 from the turning wheels 3 via the tie rod ends due to a road surface disturbance input to the turning wheels 3, or the like. The steering torque detected by the torque sensor 10 is detected, for example, as a positive value for the left rotation and a negative value for the right rotation and vice versa. The torque sensor 10 is electrically connected to the EPS control ECU 12 and outputs a detection signal corresponding to the detected steering torque to the EPS control ECU 12.

The EPS control ECU 12 controls the constituent units of the steering apparatus 1. The EPS control ECU 12 is an electronic circuit having a known microcomputer including a CPU, a ROM, a RAM, and an interface as principal parts. The EPS control ECU 12 is electrically connected to various sensors such as the torque sensor 10, the steering angle sensor 9, and the rotation angle sensor 11 or the EPS unit 8. The rotation angle detected by the rotation angle sensor 11 is used, for example, for a current control (output control) on the motor 8a by the EPS control ECU 12. Here, the EPS control ECU 12 is electrically connected to a vehicle speed sensor 13 and the like. The vehicle speed sensor 13 detects the vehicle speed which is a running speed of the vehicle 2. Electrical signals (detection signals) corresponding to the detection results of various sensors are input to the EPS control ECU 12, and the EPS control ECU 12 outputs a drive signal to the EPS unit 8 on the basis of the input detection results to control the driving thereof. The EPS control ECU 12 can perform a control of adjusting the torque to be generated from the EPS unit 8 on the basis of detected steering operation physical quantities. The EPS control ECU 12 adjusts the assist torque and the like, for example, by adjusting a motor supply current which is a supply current to the motor 8a to adjust the output torque of the motor 8a. Here, the motor supply current is a current having a magnitude enough to generate a predetermined torque requested by the EPS unit 8. At this time, the EPS control ECU 12 may control the motor supply current to the motor 8a, for example, on the basis of the rotation angle detected by the rotation angle sensor 11. The EPS control ECU 12 may have a configuration in which the EPS control ECU 12 is electrically connected to the ECU controlling the constituent units of the vehicle 2 having the steering apparatus 1 mounted thereon and transmits and receives information such as the detection signals, the drive signals, and the control commands via the ECU, or may be incorporated into the ECU as a unified body.

In the steering apparatus 1 having the above-mentioned configuration, the torque and the like generated by the EPS unit 8 under the control of the EPS control ECU 12 along with the torque input to the steering 4 from the driver acts on the shaft 5. In the steering apparatus 1, when the steering force and the steering assist force act on the tie rods 7 via the gear mechanism 6 from the shaft 5, the tie rods 7 are displaced to the right and left sides to turn the turning wheels 3 by an axial force having a magnitude based on the driver steering torque from the driver and the torque generated from the EPS unit 8. As a result, the steering apparatus 1 can turn the turning wheels 3 by the use of the steering force input to the steering 4 from the driver and the steering assist force generated from the EPS unit 8. Accordingly, it is possible to assist the driver's steering operation and thus to reduce the driver's burden in the steering operation. In the steering apparatus 1, the force acting on the steering 4 is mainly a steering force from the driver. On the other hand, regarding the force counteracting from the steering 4, the movement in the rotation direction (including static=holding of steering) is determined in relation to a road surface reaction, a high-frequency component is mainly based on the road surface reaction and tends to be generated even with a large steering holding force.

The EPS control ECU 12 of this embodiment controls the EPS unit 8, for example, on the basis of the detection results from various sensors and can perform various steering controls such as a damping control and a target return control in addition to the assist control. These controls are performed by adjusting the torque generated from the EPS unit 8. The assist control is a control of generating an assist force for assisting the driver's steering operation of the steering 4 by the use of the EPS unit 8 as described above. The damping control is a control of generating a damping force for simulating damping corresponding to viscosity characteristics of the steering apparatus 1 by the use of the EPS unit 8. The steering apparatus 1 can guarantee convergence or provide a steering reaction, by applying the damping force acting in the direction in which the steering speed of the steering 4 is reduced by the damping control to reduce the steering speed of the steering 4. The target return control is a return control of assisting the steering operation to the neutral position of the steering 4. More specifically, the target return control is a control of smoothly returning the steering 4 to the neutral position by applying a steering wheel restoring force (steering wheel restoring torque) to the neutral position of the steering 4 by the use of the EPS unit 8 depending on the target steering speed.

Figure 2:
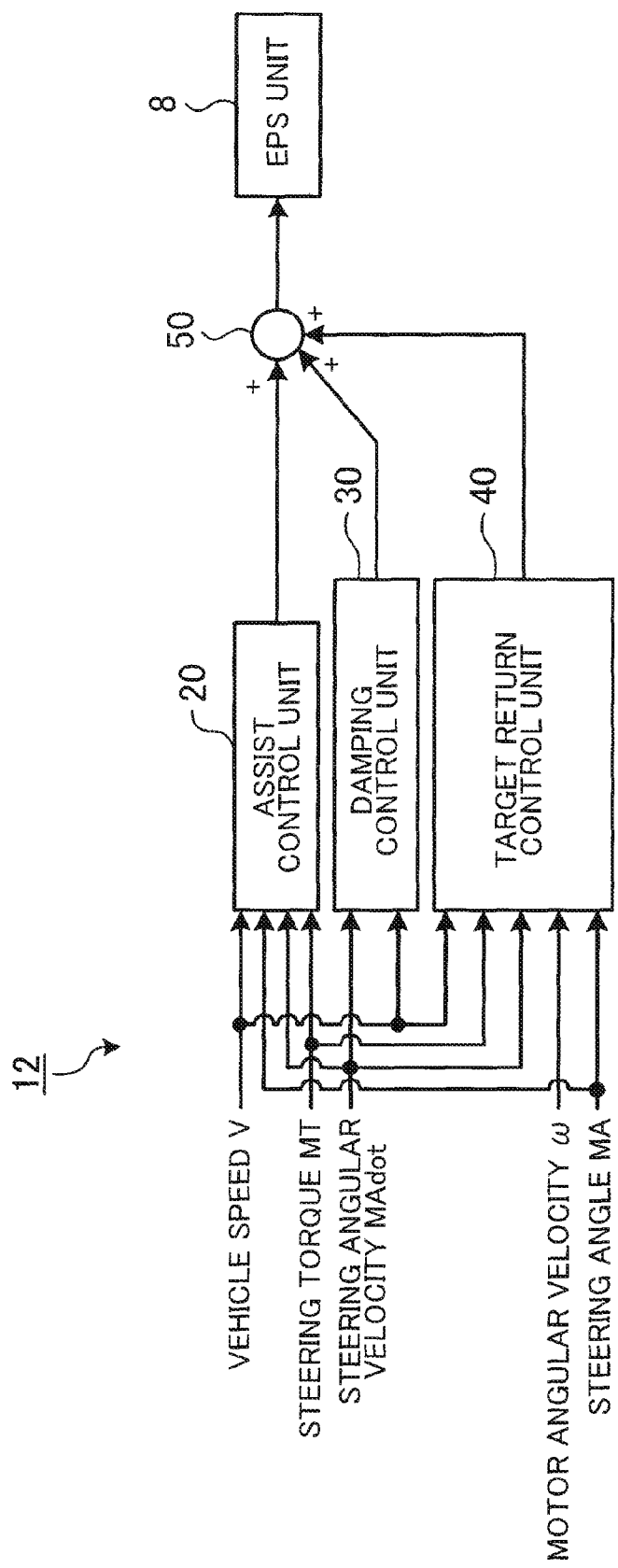
FIG. 2 is a block diagram schematically illustrating a configuration example of an EPS control ECU according to an embodiment.

FIG. 2 is a block diagram schematically illustrating a configuration example of the EPS control ECU 12. The EPS control ECU 12 of this embodiment includes an assist control unit 20, a damping control unit 30, a target return control unit 40, and an adder 50, for example, in terms of functional concepts.

The assist control unit 20 calculates an assistance quantity in the assist control. The detection signal corresponding to the vehicle speed V from the vehicle speed sensor 13 and the detection signal corresponding to the steering torque MT from the torque sensor 10 are input to the assist control unit 20. The detection signal corresponding to the steering angle MA from the steering angle sensor 9 and the detection signal corresponding to the steering angular velocity MAdot based on the steering angle MA are input to the assist control unit 20. The assist control unit 20 computes a target assist torque as an assistance quantity using various methods on the basis of the input detection signals. The assist control unit 20 outputs a signal corresponding to the computed assistance quantity to the adder 50.

The damping control unit 30 calculates a damping force in the damping control. The detection signal corresponding to the vehicle speed V from the vehicle speed sensor 13 and the detection signal corresponding to the steering angular velocity MAdot based on the steering angle MA from the steering angle sensor 9 are input to the damping control unit 30. The damping control unit 30 computes a torque corresponding to a target damping force as a damping quantity using various methods on the basis of the input detection signals. The damping control unit 30 outputs a signal corresponding to the computed damping quantity to the adder 50.

The target return control unit 40 calculates a target return quantity in the target return control. The detection signal corresponding to the vehicle speed V from the vehicle speed sensor 13 and the detection signal corresponding to the steering torque MT from the torque sensor 10 are input to the target return control unit 40. The detection signal corresponding to the steering angle MA and the detection signal corresponding to the steering angular velocity MAdot based on the steering angle MA from the steering angle sensor 9 are input to the target return control unit 40. The detection signal corresponding to the motor angular velocity w based on the rotation angle of the rotor shaft of the motor 8a from the rotation angle sensor 11 is input to the target return control unit 40. The target return control unit 40 computes a steering wheel restoring torque corresponding to a target steering speed as a target return quantity using various methods on the basis of the input detection signals. The target return control unit 40 outputs a signal corresponding to the computed target return quantity to the adder 50.

The signal corresponding to the assistance quantity from the assist control unit 20, the signal corresponding to the damping quantity from the damping control unit 30, and the signal corresponding to the target return quantity from the target return control unit 40 are input to the adder 50. The adder 50 computes a target steering quantity (corresponding to the final target torque) by adding the assistance quantity, the damping quantity, and the target return quantity on the basis of the input signals. The adder 50 outputs a signal corresponding to the computed target steering quantity as an EPS assist command to the EPS unit 8 and controls the motor 8a of the EPS unit 8. Accordingly, the EPS control ECU 12 implements the assist control, the damping control, and the target return control.

Here, the EPS control ECU 12 of this embodiment can perform the above-mentioned steering controls using steering power corresponding to the product of a parameter associated with the steering angle detected by the steering angle sensor 9 and a parameter associated with the steering torque detected by the torque sensor 10 as a physical quantity indicating the driver's steering operation. Accordingly, the EPS control ECU 12 can separately perform an active operation on the steering 4 and a passive operation on the steering 4 as an operation in consideration of the driver's operation intention to implement various steering controls.

The EPS control ECU 12 of this embodiment performs the assist control using the steering power. More specifically, the EPS control ECU 12 calculates the target assistance quantity in the assist control on the basis of the steering power and performs the assist control on the basis of the calculated target assistance quantity. Accordingly, the EPS control ECU 12 can implement the assist control in consideration of the driver's intention.

The active operation on the steering 4 is typically an operation in relatively strong consideration of, the driver's operation intention. On the other hand, the passive operation on the steering 4 is typically an operation in relatively weak consideration of the driver's operation intention, for example, a defective operation corresponding to disturbance or stability compensation. More specifically, the active operation on the steering 4 may include an aggressive steering operation that is performed by the driver so as to move the vehicle 2 to a target position. The active operation is typically an operation in a state where the driver actively works, a state where so-called myoelectricity is generated, a state where a command is actively issued from the brain, and the like and is, for example, an operation of grasping and steering the steering 4 and changing the vehicle 2 from a straight running state to a turning state. On the other hand, the passive operation on the steering 4 may include a steering operation that is performed by the driver so as to hold the vehicle 2 to a target position against disturbance, an hand-free operation in which the hands are detached from the steering 4, or a steering holding operation of holding the steering 4 to keep the running direction of the vehicle 2 constant. The passive operation is, for example, an operation of grasping the steering 4 and coping with road surface disturbance or the like.

The steering power used for the control of the EPS control ECU 12 will be described in more detail below. The steering power is an index indicating power in the driver's steering operation on the steering 4 and is a physical quantity indicating energy used per unit time. The steering power P can be expressed by Expression (1) using an amount of steering work W when time is defined as "t". Here, the amount of steering work W is an index indicating work in the driver's steering operation on the steering 4 and is a physical quantity indicating used energy.

$$P = dW/dt \qquad (1)$$

The steering power P can be calculated on the basis of one or both of the product of the steering angular velocity (corresponding to the differential value of the steering angle) MAdot based on the steering angel MA detected by the steering angle sensor 9 and the steering torque MT detected by the torque sensor 10 and the product of the steering angle MA detected by the steering angle sensor 9 and the steering torque differential value MTdot based on the steering torque MT detected by the torque sensor 10. Here, the steering power based on the product [MT·MAdot] of the steering torque MT and the steering angular velocity MAdot is defined as first steering power P1 and the steering power based on the product [MTdot·MA] of the steering torque differential value MTdot and the steering angle MA is defined as second power P2. The EPS control ECU 12 of this embodiment can use, for example, a composite model expressed by Expression (2) as a composite model expressing activeness/passiveness of the driver's operation.

$$P = P1 + P2 = MT \cdot MAdot + MTdot \cdot MA \qquad (2)$$

The steering power P (in other words, energy term) calculated by Expression (2) indicates a passive operation when "P<0" is established and indicates an active operation when "P>0" is established. For example, when the assist control is performed on the basis of the steering power P calculated by Expression (2) and "P<0" is established, the driver's operation is a passive operation and thus the EPS control ECU 12 sets the assistance quantity to be relatively small depending on the steering power P. When "P>0" is established, the driver's operation is an active operation and thus the EPS control ECU 12 sets the assistance quantity to be relatively large depending on the steering power P. Accordingly, the EPS control ECU 12 can appropriately determine the active operation and the passive operation depending on situations and can reflect the driver's intension in the assistance quantity in the assist control.

Here, the EPS control ECU 12 may use values, which are obtained by dividing the first steering power and the second steering power by the absolute value of the steering torque MT and the absolute value of the steering angle MA, respectively, in the first steering power P1 term and the second steering power P2 term of Expression (2). That is, the EPS control ECU 12 may perform the assist control on the basis of the steering power P calculated by Expression (3). Accordingly, the EPS control ECU 12 can emphasize a degree of contribution of the steering angular velocity MAdot to the first steering power P1 term and can emphasize a degree of contribution of the steering torque differential value MTdot to the second steering power P2 term.

$$P = [MT/|MT|] \cdot MAdot + MTdot \cdot [MA/|MA|] \qquad (3)$$

The EPS control ECU 12 of this embodiment achieves great improvement in steering sensation felt by the driver by calculating a correction assistance quantity in the assist control using a steering angular velocity coefficient K1 and a torque coefficient K2 as weighting coefficients based on frequencies in Expression (3).

The EPS control ECU 12 of this embodiment calculates the correction assistance quantity in the assist control using Expression (4) in which the steering angular velocity coefficient K1 and the torque coefficient K2 are added to Expression (3). In Expression (4), the steering angular velocity coefficient K1 is a weighting coefficient set for the first steering power P1 term and the torque coefficient K2 is a weighting coefficient set for the second steering power P2 term.

$$\text{Correction Assistance quantity} = K1 \cdot [MT/|MT|] \cdot MAdot + K2 \cdot MTdot \cdot [MA/|MA|] \quad (4)$$

The total assistance quantity in the assist control that is performed by the EPS control ECU 12 is determined on the basis of a basic assistance quantity as a basis of the assistance quantity and the correction assistance quantity for correcting the basic assistance quantity. The EPS control ECU 12 controls the EPS unit 8 so as to perform the assist control on the basis of the total assistance quantity obtained by adding the basic assistance quantity and the correction assistance quantity. The EPS control ECU 12 of this embodiment calculates the correction assistance quantity of the total assistance quantity using Expression (4). Accordingly, the EPS control ECU 12 can give a predetermined frequency characteristic to the correction assistance quantity.

Figure 3:
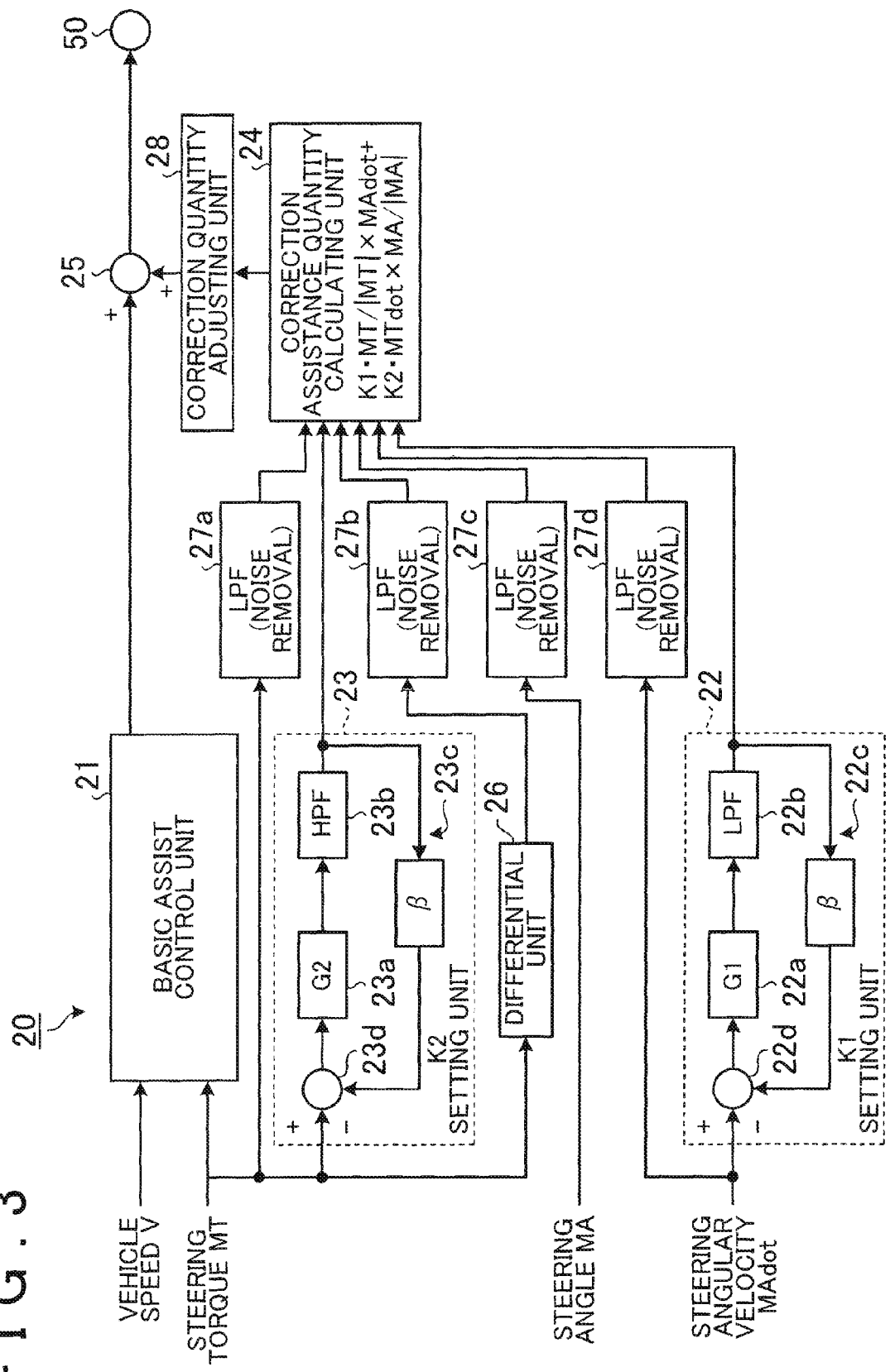
FIG. 3 is a block diagram schematically illustrating a configuration example of an assist control unit of the EPS control ECU according to the embodiment.

FIG. 3 is a block diagram schematically illustrating a configuration example of the assist control unit 20. The configuration of the assist control unit 20 will be described in more detail with reference to the drawing.

The assist control unit 20 of the EPS control ECU 12 includes a basic assist control unit 21, a K1 setting unit 22 as a steering angular velocity coefficient setting unit, a K2 setting unit 23 as a torque coefficient setting unit, a correction assistance quantity calculating unit 24, and an adder 25, for example, in terms of functional concepts. The basic assist control unit 21 calculates the basic assistance quantity. The K1 setting unit 22 sets the steering angular velocity coefficient K1 having a predetermined frequency characteristic. The K2 setting unit 23 sets the torque coefficient K2 having a predetermined frequency characteristic. The correction assistance quantity calculating unit 24 calculates the correction assistance quantity on the basis of the steering, angular velocity coefficient K1 set by the K1 setting unit 22 and the torque coefficient K2 set by the K2 setting unit 23. The adder 25 adds the basic assistance quantity calculated by the basic assist control unit 21 and the correction assistance quantity calculated by the correction assistance quantity calculating unit 24 to calculate the total assistance quantity. Here, the assist control unit 20 further includes a differential unit 26, low-pass filters (LPFs) 27a, 27b, 27c, and 27d, and a correction quantity adjusting unit 28, for example, in terms of functional concepts.

Specifically, the detection signal corresponding to the vehicle sped V from the vehicle speed sensor 13 and the detection signal corresponding to the steering torque MT from the torque sensor 10 are input to the basic assist control unit 21. The basic assist control unit 21 calculates the basic assistance quantity on the basis of the input detection signals and outputs a signal corresponding to the basic assistance quantity to the adder 25. The basic assist control unit 21 calculates the basic assistance quantity from the vehicle speed V and the steering torque MT, for example, with reference to a map that is prepared in advance by correlating the vehicle speed V, the steering torque MT, and the basic assistance quantity with each other. For example, the basic assist control unit 21 sets the basic assistance quantity to be relatively large with an increase in the steering torque MT and sets the basic assistance quantity to be relatively small with an increase in the vehicle speed V.

The detection signal corresponding to the steering angular velocity MAdot based on the steering angle MA from the steering angle sensor 9 is input to the K1 setting unit 22. The K1 setting unit 22 sets the steering angular velocity coefficient K1 having a predetermined frequency characteristic depending on the steering angular velocity MAdot on the basis of the input detection signal and outputs a signal corresponding to the steering angular velocity coefficient K1 to the correction assistance quantity calculating unit 24. The K1 setting unit 22 of this embodiment includes a negative feedback unit and sets the steering angular velocity coefficient K1 for the steering angular velocity MAdot having the same magnitude to become larger as a feedback quantity of the negative feedback unit becomes larger.

Specifically, the K1 setting unit 22 includes a first amplifier 22a, a low-pass filter (LPF) 22b as a first filter, and a first negative feedback circuit 22c and constitutes a negative feedback amplifier circuit having the signal of the steering angular velocity MAdot as an input. The first amplifier 22a is constituted by a so-called operational amplifier and amplifies and outputs the input corresponding to the steering angular velocity MAdot which is the speed of the steering angle MA detected by the steering angle sensor 9 with a predetermined gain G1. The LPF 22b performs a low-pass filtering process of removing a predetermined high-frequency component of the output of the first amplifier 22a and outputting the resultant output as the steering angular velocity coefficient K1. The LPF 22b performs the low-pass filtering process on the signal output from the first amplifier 22a using a predetermined high-frequency component other than a predetermined low-frequency component as a cutoff frequency. Here, the predetermined low-frequency component is, for example, a component equal to or greater than 0.1 Hz and less than 0.3 Hz, and the predetermined high-frequency component (cutoff frequency) is, for example, a component equal to or greater than 0.3 Hz. That is, the LPF 22b performs a filtering process of removing the high-frequency component equal to or greater than 0.3 Hz on the signal output from the first amplifier 22a and outputs the signal of the low-frequency component less than 0.3 Hz as a signal corresponding to the steering angular velocity coefficient K1 after the low-pass filtering process to the correction assistance quantity calculating unit 24. The first negative feedback circuit 22c constitutes a negative feedback unit and negatively feeds back the output of the LPF 22b with a predetermined feedback quantity corresponding to a feedback ratio β to the input of the first amplifier 22a. That is, the first negative feedback circuit 22c returns a part of the output of the LPF 22b to the input of the first amplifier 22a and uses the resultant obtained by causing a subtractor 22d to perform subtraction on the input as the true input of the first amplifier 22a. Here, the feedback quantity of the negative feedback unit of the K1 setting unit 22 corresponds to a physical quantity (for example, feedback voltage) of a feedback signal in the first negative feedback circuit 22c, that is, a feedback signal fed back from the output side of the first amplifier 22a to the input side. The gain G1 and the feedback ratio β are values suitable for the vehicle 2 having the steering apparatus 1 mounted thereon. As described above, by negatively feeding back the output signal after the low-pass filtering process by the LPF 22b by the use of the first negative feedback circuit 22c, the K1 setting unit 22 can give a predetermined frequency characteristic to the feedback quantity in the first negative feedback circuit 22c and the deviation in the first amplifier 22a. The operation of the K1 setting unit 22 will be described later in more detail.

The detection signal corresponding to the steering torque MT from the torque sensor 10 is input to the K2 setting unit 23. The K2 setting unit 23 sets the torque coefficient K2 having a predetermined frequency characteristic depending on the steering torque MT on the basis of the input detection signal and outputs a signal corresponding to the torque coefficient K2 to the correction assistance quantity calculating unit 24. The K2 setting unit 23 of this embodiment includes a negative feedback unit and sets the torque coefficient K2 for the steering torque MT having the same magnitude to become larger as a feedback quantity of the negative feedback unit becomes larger.

Specifically, the K2 setting unit 23 includes a second amplifier 23a, a high-pass filter (HPF) 23b as a second filter, and a second negative feedback circuit 23c and constitutes a negative feedback amplifier circuit having the signal of the steering torque MT as an input. The second amplifier 23a is constituted by a so-called operational amplifier and amplifies and outputs the input corresponding to the steering torque MT detected by the torque sensor 10 with a predetermined gain G2. The output signal from the second amplifier 23a is input to the HPF 23b. The HPF 23b performs a high-pass filtering process of removing a predetermined low-frequency component of the output of the second amplifier 23a and outputting the resultant output as the torque coefficient K2. The HPF 23b performs the high-pass filtering process on the signal output from the second amplifier 23a using a predetermined low-frequency component other than a predetermined high-frequency component as a cutoff frequency. Here, the predetermined high-frequency component is, for example, a component equal to or greater than 0.3 Hz and the predetermined low-frequency component (cutoff frequency) is, for example, a component less than 0.3 Hz. That is, the HPF 23b performs a filtering process of removing the low-frequency component less than 0.3 Hz on the signal output from the second amplifier 23a and outputs the signal of the high-frequency component equal to or greater than 0.3 Hz as a signal corresponding to the torque coefficient K2 after the low-pass filtering process to the correction assistance quantity calculating unit 24. The upper limit of the predetermined high-frequency component is, for example, about 50 Hz, that is, the predetermined high-frequency component is typically a component equal to, or greater than 0.3 Hz and equal to or less than 50 Hz. The second negative feedback circuit 23c constitutes a negative feedback unit and negatively feeds back the output of the HPF 23b with a predetermined feedback quantity corresponding to a feedback ratio β to the input of the second amplifier 23a. That is, the second negative feedback circuit 23c returns a part of the output of the HPF 23b to the input of the second amplifier 23a and uses the resultant obtained by causing a subtractor 23d to perform subtraction on the input as the true input of the second amplifier 23a. Here, the feedback quantity of the negative feedback unit of the K2 setting unit 23 corresponds to a physical quantity (for example, feedback voltage) of a feedback signal in the second negative feedback circuit 23c, that is, a feedback signal fed back from the output side of the second amplifier 23a to the input side. The gain G2 and the feedback ratio β are values suitable for the vehicle 2 having the steering apparatus 1 mounted thereon. The feedback ratio (3 of the K1 setting unit 22 and the feedback ratio β of the K2 setting unit 23 are set to the same magnitude. As described above, by negatively feeding back the output signal after the low-pass filtering process by the HPF 23b by the use of the second negative feedback circuit 23c, the K2 setting unit 23 can give a predetermined frequency characteristic to the feedback quantity in the second negative feedback circuit 23c and the deviation in the second amplifier 23a. The operation of the K2 setting unit 23 will be described later in more detail.

The signal corresponding to the steering angular velocity coefficient K1 from the K1 setting unit 22 and the signal corresponding to the torque coefficient K2 form the K2 setting unit 23 are input to the correction assistance quantity calculating unit 24. The signals subjected to the low-pass filtering process are input to the correction assistance quantity calculating unit 24 from the LPFs 27a, 27b, 27c, and 27d. Here, the detection signal corresponding to the steering torque MT from the torque sensor 10 is input to the LPF 27a, and the LPF 27a performs a filtering process of removing a frequency component other than a predetermined low-frequency component on the input signal for the purpose of removing noise for stabilization of the control and outputs the processed signal to the correction assistance quantity calculating unit 24. The signal corresponding to the steering angular velocity MAdot, which is input to the differential unit 26 from the torque sensor 10 and computed by the differential unit 26, is input to the LPF 27b, and the LPF 27b performs a filtering process of removing a frequency component other than a predetermined low-frequency component on the input signal for the purpose of removing noise for stabilization of the control and outputs the processed signal to the correction assistance quantity calculating unit 24. The detection signal corresponding to the steering angle MA from the steering angle sensor 9 is input to the LPF 27c, and the LPF 27b performs a filtering process of removing a frequency component other than a predetermined low-frequency component on the input signal for the purpose of removing noise for stabilization of the control and outputs the processed signal to the correction assistance quantity calculating unit 24. The detection signal corresponding to the steering angular velocity MAdot based on the steering angle MA from the steering angle sensor 9 is input to the LPF 27d, and the LPF 27d performs a filtering process of removing a frequency component other than a predetermined low-frequency component on the input signal for the purpose of removing noise for stabilization of the control and outputs the processed signal to the correction assistance quantity calculating unit 24.

The correction assistance quantity calculating unit 24 calculates a correction assistance quantity on the basis of the input signals and outputs the calculated correction assistance quantity to the correction quantity adjusting unit 28. That is, the correction assistance quantity calculating unit 24 calculates the correction assistance quantity on the basis of the steering angular velocity coefficient K1 determined depending on the steering angular velocity MAdot and the torque coefficient K2 determined depending on the steering torque MT. Here, the correction assistance quantity calculating unit 24 calculates the correction assistance quantity using Expression (4) on the basis of the input signals. That is, the correction assistance quantity calculating unit 24 calculates the correction assistance quantity on the basis of first steering power P1 based on the steering angular velocity coefficient K1, the steering torque MT, and the steering angular velocity MAdot and second steering power P2 based on the torque coefficient K2, the steering torque differential value MTdot, and the steering angle MA. Here, the first steering power P1 is a value corresponding to a value obtained by dividing the product of the steering angular velocity coefficient K1, the steering torque MT, and the steering angular velocity MAdot by the absolute value of the steering torque MT. The second steering power P2 is a value corresponding to a value obtained by dividing the product of the torque coefficient K2, the steering torque differential value MTdot, and the steering angle MA by the absolute value of the steering angle MA.

A signal corresponding to the correction assistance quantity is input to the correction quantity adjusting unit 28 from the correction assistance quantity calculating unit 24. The correction quantity adjusting unit 28 performs a guard process on the input signal on the basis of predetermined upper and lower limit values so as to suppress a sudden variation of the correction assistance quantity and computes a final correction assistance quantity. Then, the correction quantity adjusting unit 28 outputs a signal corresponding to the correction assistance quantity (the final correction assistance quantity subjected to the guard process) to the adder 25.

The signal corresponding to the basic assistance quantity from the basic assist control unit 21 and the signal corresponding to the correction assistance quantity from the correction quantity adjusting unit 28 are input to the adder 25. The adder 25 calculates the total assistance quantity by adding the basic assistance quantity and the correction assistance quantity on the basis of the input signals and outputs a signal corresponding to the total assistance quantity to the adder 50. The adder 50 computes a target steering quantity (corresponding to a final target torque) by adding the assistance quantity, the damping quantity, and the target return quantity, outputs a signal corresponding to the computed target steering quantity as an EPS assist command to the EPS unit 8, and controls the motor 8a of the EPS unit 8.

As a result, according to the above-mentioned configuration, the assist control unit 20 of this embodiment can be configured to set the feedback quantity of the K2 setting unit 23 when the steering torque MT is in a predetermined high-frequency range (for example, equal to or greater than 0.3 Hz and equal to or less than 50 Hz) to become larger than the feedback quantity of the K1 setting unit 22 when the steering angular velocity MAdot is in a predetermined high-frequency range. According to this configuration, the assist control unit 20 can be configured to set the feedback quantity of the K1 setting unit 22 when the steering angular velocity MAdot is in a predetermined low-frequency range (for example, equal to or greater than 0.1 Hz and less than 0.3 Hz) to become larger than the feedback quantity of the K2 setting unit 23 when the steering torque MT is in a predetermined low-frequency range.

Figure 4:
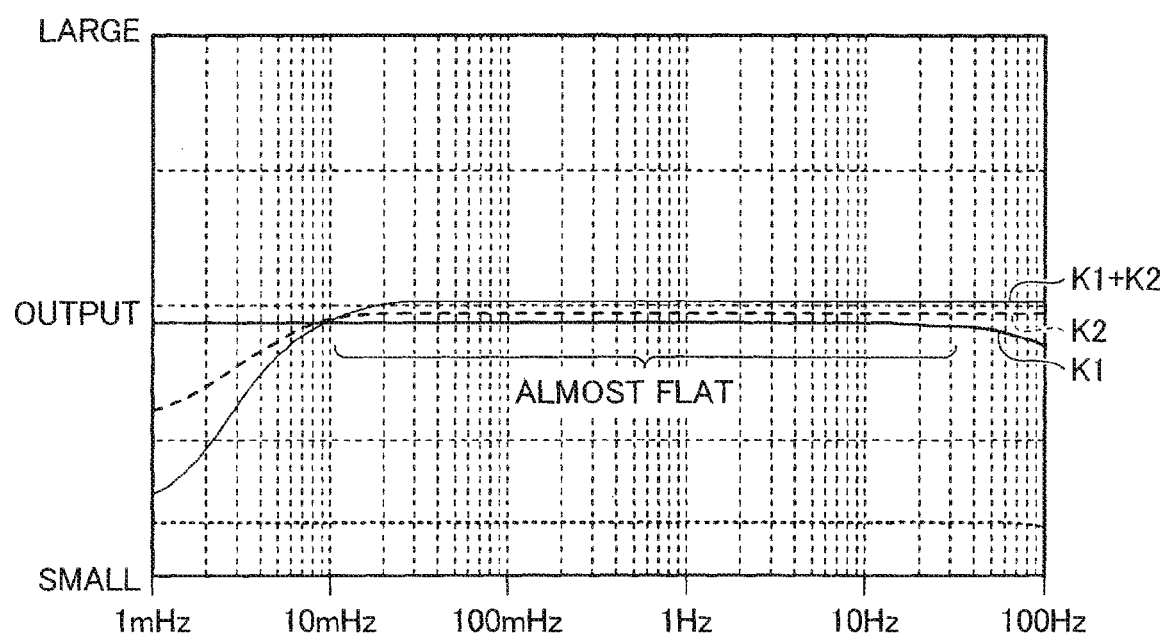
FIG. 4 is a diagram illustrating an example of frequency characteristics of outputs of a K1 setting unit and a K2 setting unit.
Figure 5:
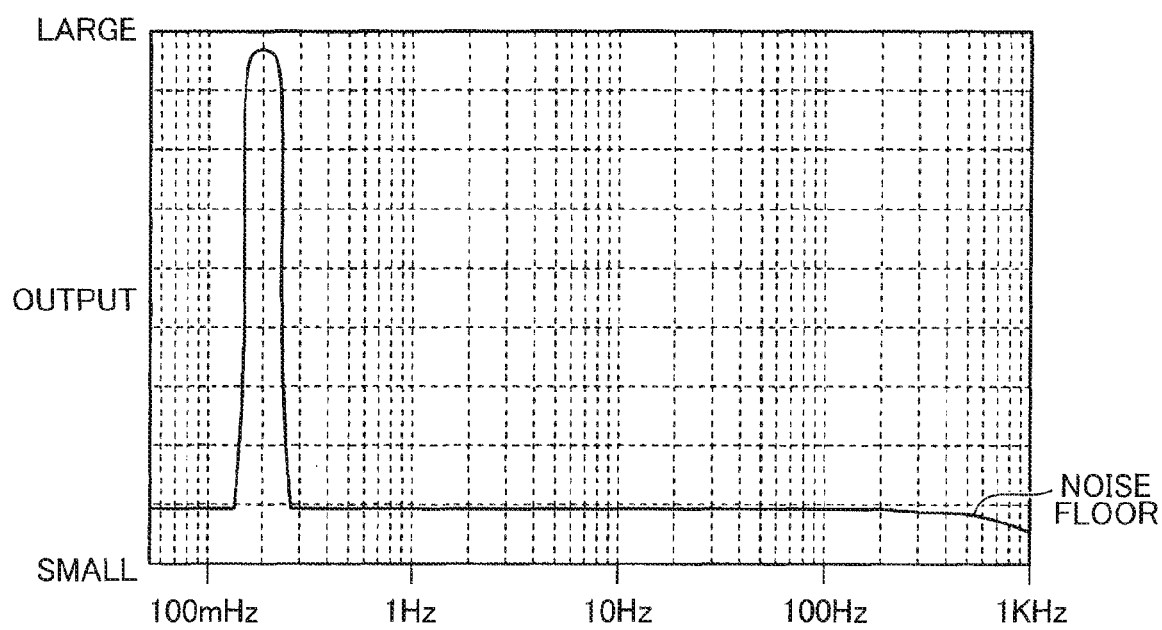
FIG. 5 is a diagram illustrating an example of an FFT result of the output of the K1 setting unit at the time of inputting of a low-frequency component.
Figure 6:
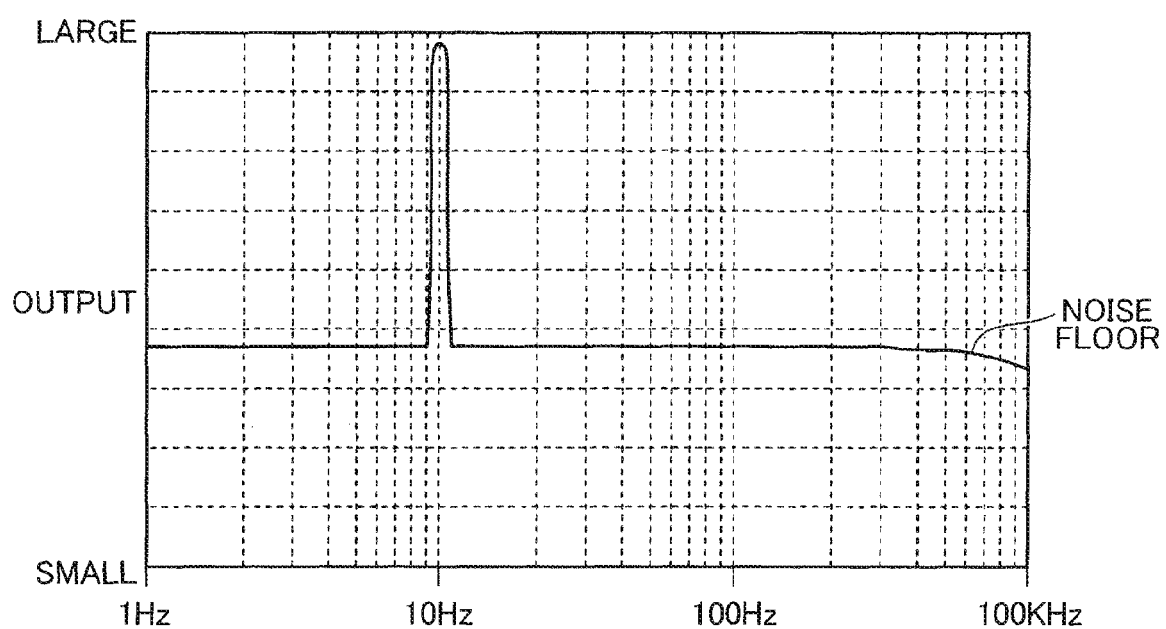
FIG. 6 is a diagram illustrating an example of an FFT result of the output of the K1 setting unit at the time of inputting of a high-frequency component.
Figure 7:
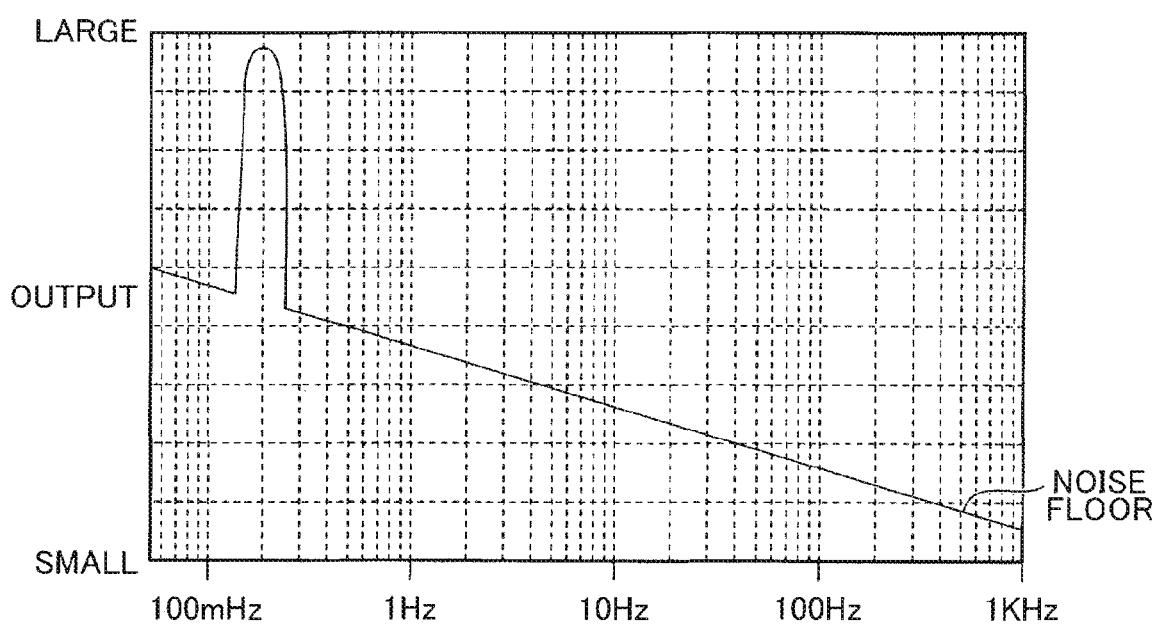
FIG. 7 is a diagram illustrating an example of an FFT result of the output of the K2 setting unit at the time of inputting of a low-frequency component.
Figure 9:
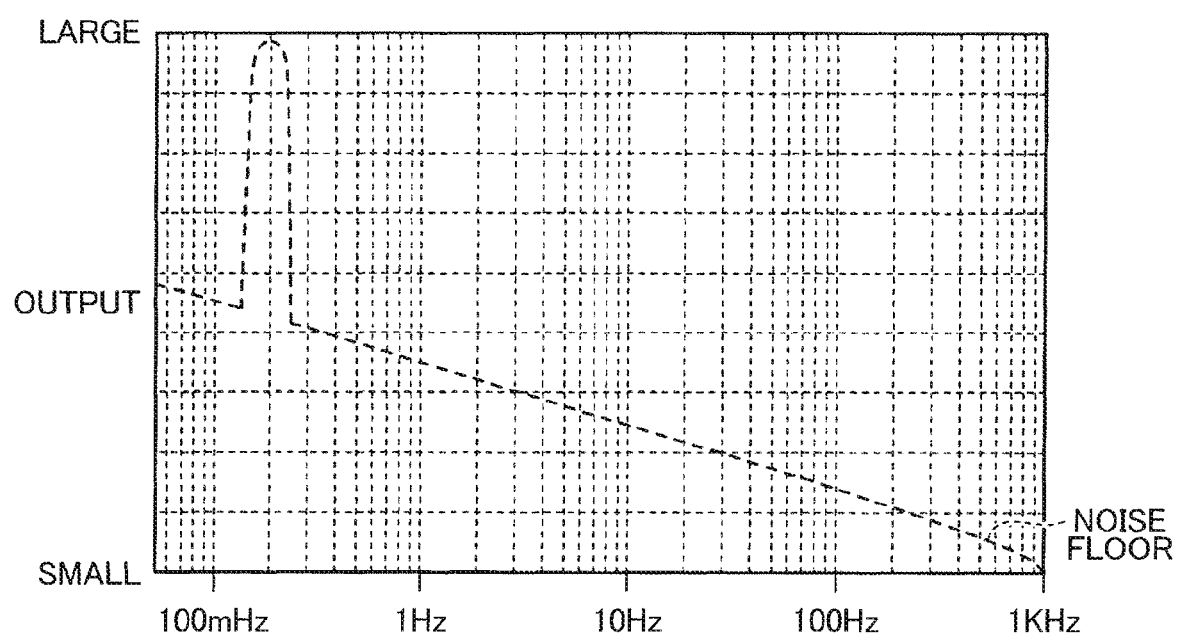
FIG. 9 is a diagram illustrating an example of an FFT result of an output of a correction quantity adjusting unit at the time of inputting of a low-frequency component.
Figure 10:
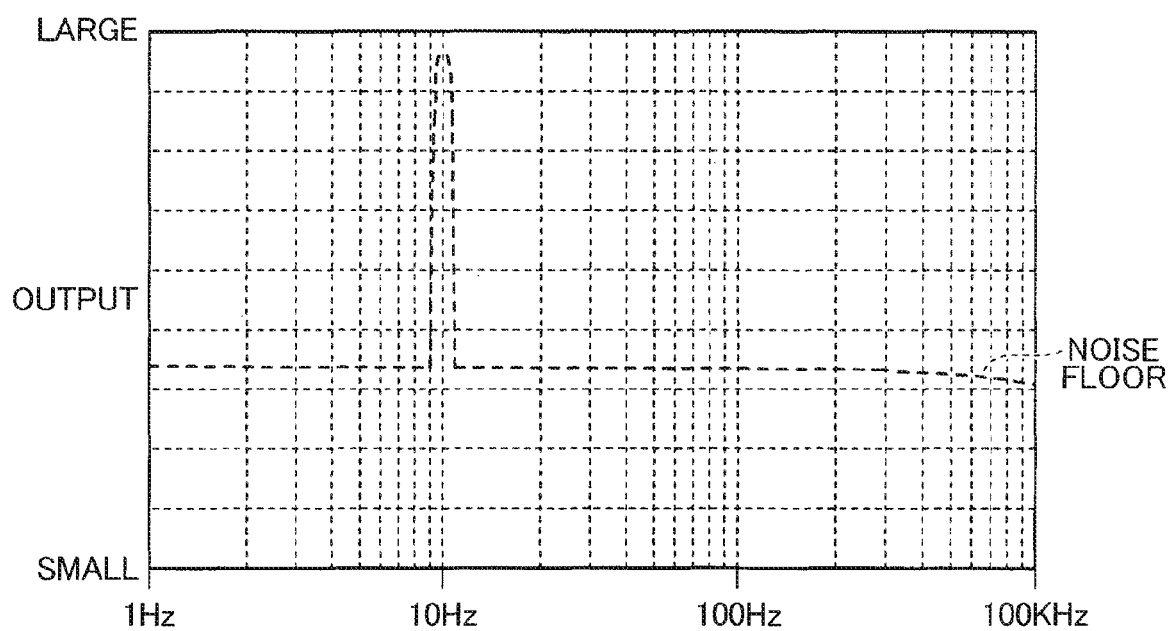
FIG. 10 is a diagram illustrating an example of an FFT result of the output of the correction quantity adjusting unit at the time of inputting of a high-frequency component.

The operation of the assist control unit 20 will be described below in more detail with reference to FIGS. 4 to 10. FIG. 4 is a diagram illustrating an example of frequency characteristics of outputs of the K1 setting unit 22 and the K2 setting unit 23. FIG. 5 is a diagram illustrating an example of an FFT (Fast Fourier Transform) result of the output of the K1 setting unit 22 at the time of inputting of a low-frequency component (for example, input of 0.2 Hz). FIG. 6 is a diagram illustrating an example of an FFT result of the output of the K1 setting unit 22 at the time of inputting of a high-frequency component (for example, input of 10 Hz). FIG. 7 is a diagram illustrating an example of the FFT result of the output of the K2 setting unit 23 at the time of inputting of a low frequency component (for example, input of 0.2 Hz). FIG. 8 is a diagram illustrating an example of the FFT result of the output of the K2 setting unit 23 at the time of inputting of a high-frequency component (for example, input of 10 Hz). FIG. 9 is a diagram illustrating an example of the FFT result of the output of the correction quantity adjusting unit 28 at the time of inputting of a low-frequency component (for example, input of 0.2 Hz). FIG. 10 is a diagram illustrating an example of the FFT result of the output of the correction quantity adjusting unit 28 at the time of inputting of a high-frequency component (for example, input of 10 Hz). In FIGS. 4 to 10, the horizontal axis represents the frequency and the vertical axis represents the output.

The K1 setting unit 22 and the K2 setting unit 23 of the assist control unit 20, a negative feedback amplifier circuit is constituted by the first amplifier 22a, the first negative feedback circuit 22c, the second amplifier 23a, and the second negative feedback circuit 23c. Accordingly, the K1 setting unit 22 and the K2 setting unit 23 can suppress unbalance of net gains (gains G1 and G2) of the first amplifier 22a and the second amplifier 23a and can relatively broaden the frequency range which can be amplified with a gain constant in the whole circuit.

That is, when signals having the equivalent magnitude not having distortion (that is, not having disturbance) are input to the K1 setting unit 22 and the K2 setting unit 23, the frequency characteristics of the output signals of the K1 setting unit 22 and the K2 setting unit 23, that is, the steering angular velocity coefficient K1 and the torque coefficient K2, are almost flat as illustrated in FIG. 4. The frequency characteristics of the combined coefficient K1+K2 of the steering angular velocity coefficient K1 and the torque coefficient K2 are similarly almost flat.

The K1 setting unit 22 constitutes the negative feedback amplifier circuit and then negatively feeds back the output signal subjected to the low-pass filtering process by the LPF 22b through the use of the first negative feedback circuit 22c. Accordingly, the K1 setting unit 22 sets an equivalent gain regardless of the frequency and then can give the frequency characteristics corresponding to the LPF 22b to the deviation in the first amplifier 22a in addition to the feedback quantity in the first negative feedback circuit 22c.

FIG. 5 illustrates an example of an SN ratio (signal/noise ratio) of the output signal of the K1 setting unit 22 at the time of inputting of a low-frequency component and FIG. 6 illustrates an example of an SN ratio of the output signal of the K1 setting unit 22 at the time of inputting of a high-frequency component. In the K1 setting unit 22, the feedback quantity in the first negative feedback circuit 22c relatively increases in response to the input in a low-frequency range. As a result, in the K1 setting unit 22, the deviation in the first amplifier 22a relatively decreases, the noise floor in the output signal relatively decreases as illustrated in FIG. 5, the response of the output to the input in the low-frequency range is sensitive (high in responsiveness and followability) and is highly accurate. Accordingly, in response to an input in the low-frequency range to the K1 setting unit 22, the output responds to and follows a relatively-small input variation (deviation) and relatively increases. On the other hand, in the K1 setting unit 22, the feedback quantity in the first negative feedback circuit 22c relatively decreases in response to the input in a high-frequency range. As a result, in the K1 setting unit 22, the deviation in the first amplifier 22a relatively increases, the noise floor in the output signal relatively increases as illustrated in FIG. 6, the response of the output to the input in the high-frequency range is insensitive (low in responsiveness and followability) and is low accurate. Accordingly, in response to an input in the high-frequency range to the K1 setting unit 22, the output does not respond to (follow) a relatively-small input variation (deviation) and is kept relatively low (typically the output corresponding to the noise floor is maintained).

As a result, the K1 setting unit 22 can set the steering angular velocity coefficient K1 having the frequency characteristics corresponding to the LPF 22b. That is, in response to the input of the steering angular velocity having an equivalent magnitude to the K1 setting unit 22, the feedback quantity in the low-frequency range increases, the response of the output is sensitive, and the output relatively increases, whereby the steering angular velocity coefficient K1 is set to a relatively-large value. On the other hand, in response to the input of the steering angular velocity having an equivalent magnitude to the K1 setting unit 22, the feedback quantity in the high-frequency range decreases, the response of the output is insensitive, and the output is kept relatively small, whereby the steering angular velocity coefficient K1 is set to a relatively-small value.

On the other hand, the K2 setting unit 23 constitutes the negative feedback amplifier circuit and then negatively feeds back the output signal subjected to the high-pass filtering process by the HPF 23b through the use of the second negative feedback circuit 23c. Accordingly, the K2 setting unit 23 sets an equivalent gain regardless of the frequency and then can give the frequency characteristics corresponding to the HPF 23b to the deviation in the second amplifier 23a in addition to the feedback quantity in the second negative feedback circuit 23c.

FIG. 7 illustrates an example of an SN ratio of the output signal of the K2 setting unit 23 at the time of inputting of a low-frequency component and FIG. 8 illustrates an example of an SN ratio of the output signal of the K2 setting unit 23 at the time of inputting of a high-frequency component. In the K2 setting unit 23, the feedback quantity in the second negative feedback circuit 23c relatively increases in response to the input in a high-frequency range. As a result, in the K2 setting unit 23, the deviation in the second amplifier 23a relatively decreases, the noise floor in the output signal relatively decreases as illustrated in FIG. 8, the response of the output to the input in the low-frequency range is sensitive (high in responsiveness and followability) and is highly accurate. Accordingly, in response to an input in the high-frequency range to the K2 setting unit 23, the output responds to and follows a relatively-small input variation (deviation) and relatively increases. On the other hand, in the K2 setting unit 23, the feedback quantity in the second negative feedback circuit 23c relatively decreases in response to the input in a high frequency range. As a result, in the K2 setting unit 23, the deviation in the second amplifier 23a relatively increases, the noise floor in the output signal relatively increases as illustrated in FIG. 7, the response of the output to the input in the low-frequency range is insensitive (low in responsiveness and followability) and is low accurate. Accordingly, in response to an input in the low-frequency range to the K2 setting unit 23, the output does not respond to (follow) a relatively-small input variation (deviation) and is kept relatively low (typically the output corresponding to the noise floor is maintained).

As a result, the K2 setting unit 23 can set the torque coefficient K2 having the frequency characteristics corresponding to the HPF 23b. That is, in response to the input of the steering torque having an equivalent magnitude to the K2 setting unit 23, the feedback quantity in the high-frequency range increases, the response of the output is sensitive, and the output relatively increases, whereby the torque coefficient K2 is set to a relatively-large value. On the other hand, in response to the input of the steering torque having an equivalent magnitude to the K2 setting unit 23, the feedback quantity in the low-frequency range decreases, the response of the output is insensitive, and the output is kept relatively small, whereby the torque coefficient K2 is set to a relatively-small value.

According to this configuration, the assist control unit 20 can set the feedback quantity of the K2 setting unit 23 when the steering torque MT is in a predetermined high-frequency range to become larger than the feedback quantity of the K1 setting unit 22 when the steering angular velocity MAdot is in a predetermined high-frequency range. Accordingly, the assist control unit 20 can set the torque coefficient K2 when the steering torque MT is in the predetermined high-frequency range to become larger than the steering angular velocity coefficient K1 when the steering angular velocity MAdot is in the predetermined high-frequency range. The assist control unit 20 can set the feedback quantity of the K1 setting unit 22 when the steering angular velocity MAdot is in the predetermined low-frequency range to become larger than the feedback quantity of the K2 setting unit 23 when the steering torque MT is in the predetermined low-frequency range. Accordingly, the assist control unit 20 can set the steering angular velocity coefficient K1 when the steering angular velocity MAdot is in the predetermined low-frequency range to become larger than the torque coefficient K2 when the steering torque MT is in the predetermined low-frequency range.

As a result, regarding the correction assistance quantity calculated by the correction assistance quantity calculating unit 24, the correction quantity of the second steering power P2 term component including the torque coefficient K2 relatively increases and the correction quantity of the first steering power P1 term component including the steering angular velocity coefficient K1 relatively decreases in response to the input in the high-frequency range. On the other hand, regarding the correction assistance quantity calculated by the correction assistance quantity calculating unit 24, the correction quantity of the first steering power P1 term component relatively increases and the correction quantity of the second steering power P2 term component relatively decreases, in response to the input in the low-frequency range. FIG. 9 illustrates an example of the SN ratio of the output signal of the correction quantity adjusting unit 28 at the time of inputting of a low-frequency component and FIG. 10 illustrates an example of the SN ratio of the output signal of the correction quantity adjusting unit 28 at the time of inputting of a high-frequency component.

Accordingly, in the steering apparatus 1, the correction assistance quantity of the second steering power P2 term component including the torque coefficient K2 relatively increases and the correction assistance quantity of the first steering power P1 term component including the steering angular velocity coefficient K1 relatively decreases, in response to the input in the high-frequency range, whereby the character of the torque feedback in the assist control becomes stronger. Accordingly, for example, when a high-frequency torque is generated due to a reverse input at the time of holding of the steering or the like, the steering apparatus 1 operates against the reverse input so as not to transmit the reverse input to the driver side. More specifically, since the correction assistance quantity of the second steering power P2 term component relatively increases in response to the input in a high-frequency range, the steering apparatus 1 can, suppress a variation in high-order torque and can suppress a variation in torque due to disturbance in the high-frequency range. As a result, the steering apparatus 1 can enhance blocking properties against the reverse input from the road surface, can strongly resist the torque disturbance, and can stabilize the input in the high-frequency range, thereby improve the steering sensation. Since the correction assistance quantity of the first steering power P1 term component in response to an input in a high-frequency range relatively decreases, the steering apparatus 1 can avoid a decrease in controllability with minute amplitudes and can reduce a driver's unconscious steering input, thereby improving the steering sensation.

On the other hand, in the steering apparatus 1, the correction assistance quantity of the first steering power P1 term component including the steering angular velocity coefficient K1 relatively increases and the correction assistance quantity of the second steering power P2 term component including the torque coefficient K2 relatively decreases, in response to the input in the low-frequency range, whereby the character of the steering angular velocity feedback in the assist control becomes stronger. Accordingly, for example, when, a signal associated with a torque is weakened at the time of running on a low-μ road and the like and reliability is low, the steering apparatus 1 performs the assist control with the influence of the signal associated with the torque decreased and the influence of a signal associated with the steering angular velocity increased. More specifically, since the correction assistance quantity of the first steering power P1 term component relatively increases in response to the input in a low-frequency range, the steering apparatus 1 can suppress a variation in low-order steering angular velocity and can easily reflect the driver's steering input in the low-frequency range, thereby improving the steering sensation. In addition, the steering apparatus 1 can suppress the variation in steering angle due to the road surface disturbance and can strongly resist the steering angle disturbance. Since the correction assistance quantity of the second steering power P2 term component relatively decreases in response to the input in the low-frequency range to easily transmit the reverse input from the road surface, the steering apparatus 1 can increase road information transmitted to the driver. Accordingly, the steering apparatus 1 can appropriately secure information (information transmission) transmitted to the driver side from the road surface side in response to the input in the low-frequency range, thereby improving the steering sensation.

As described above, the steering apparatus 1 includes the steering 4, the EPS unit 8, the steering angle sensor 9, the torque sensor 10, and the EPS control ECU 12. The steering 4 can steer the turning wheels 3 of the vehicle 2. The EPS unit 8 assists the operation of the steering 4. The steering angle sensor 9 detects the steering angle of the steering 4. The torque sensor 10 detects the torque applied to the shaft 5 rotating along with the steering 4. The EPS control ECU 12 controls the EPS unit 8 on the basis of the basic assistance quantity which, is an assistance quantity as a basis and the correction assistance quantity for correcting the basic assistance quantity. The EPS control ECU 12 includes the correction assistance quantity calculating unit 24, the K1 setting unit 22, and the K2 setting unit 23. The correction assistance quantity calculating unit 24 calculates the correction assistance quantity on the basis of the steering angular velocity coefficient K1 determined depending on the steering angular velocity which is the speed of the steering angle detected by the steering angle sensor 9 and the torque coefficient K2 determined depending on the torque detected by the torque sensor 10. The K1 setting unit 22 sets the steering angular velocity coefficient K1 on the basis of the steering angular velocity which is the speed of the steering angle detected by the steering angle sensor 9, includes a negative feedback unit, and sets the steering angular velocity coefficient K1 for the steering angular velocity having the same magnitude to become larger as the feedback quantity of the negative feedback unit becomes, larger. The K2 setting unit 23 sets the torque coefficient K2 on the basis of the torque detected by the torque sensor 10, includes a negative feedback unit, and sets the torque coefficient K2 for the torque having the same, magnitude to become larger as the feedback quantity of the negative feedback unit becomes larger. The EPS control ECU 12 sets the feedback quantity of the K2 setting unit 23 when the torque is in a predetermined high-frequency range to become larger than the feedback quantity of the K1 setting unit 22 when the steering angular velocity is in a predetermined high-frequency range. In other words, the EPS control ECU 12 sets the torque coefficient K2 when the torque is in the predetermined high-frequency range to become larger than the steering angular velocity coefficient K1 when the steering angular velocity is in the predetermined high-frequency range.

Accordingly, since the EPS control ECU 12 of the steering apparatus 1 can cause the suppression of the torque variation in response to the input in a high-frequency range appropriately, the decrease of the driver's unconscious steering input, the reflection of the driver's steering input in response to the input in a low-frequency range, the suppression of the steering angle variation; the increase in the amount of road information, and the like to be appropriately compatible with one another, it is possible to improve the steering sensation given to the driver. For example, the EPS control ECU 12 of the steering apparatus 1 can easily reflect the driver's intention, that is, the driver's steering input, in response to the input in the low-frequency range without affecting basic input and output characteristics and can be easily stabilized in response to the input in the high-frequency range.

The steering apparatus and the steering controller according to the embodiment of the invention are not limited to the above-mentioned embodiment, but can be modified in various forms without departing from the scope of the claims.

In the above-description, a column assist type EPS apparatus has been exemplified above as the steering apparatus, but the invention is not limited to and can be applied to any type of steering apparatus such as a pinion assist type and a rack assist type.

The invention claimed is:
1. A steering apparatus comprising:
a steering member that turns turning wheels of a vehicle;
an actuator that assists an operation on the steering member;
a steering angle detector that detects a steering angle of the steering member;
a torque detector that detects a torque acting on a steering shaft unit rotating along with the steering member; and
a steering controller that includes
a steering angular velocity coefficient setting unit that sets a steering angular velocity coefficient on the basis of a steering angular velocity which is a speed of the steering angle detected by the steering angle detector, that includes a first negative feedback unit, and that sets the steering angular velocity coefficient for the steering angular velocity having the same magnitude to become larger as a feedback quantity of the first negative feedback unit becomes larger, a torque coefficient setting unit that sets a torque coefficient on the basis of the torque detected by the torque detector, that includes a second negative feedback unit, that sets the torque coefficient for the torque having the same magnitude to become larger as a feedback quantity of the second negative feedback unit becomes larger, and that sets a feedback quantity of the torque coefficient setting unit when the torque is in a predetermined high-frequency range to become larger than a feedback quantity of the steering angular velocity coefficient setting unit when the steering angular velocity is in a predetermined high-frequency range, and a correction assistance quantity calculating unit that calculates the correction assistance quantity on the basis of the steering angular velocity coefficient and the torque coefficient, wherein the steering controller controls the actuator on the basis of a basic assistance quantity which is an assistance quantity as a basis and the correction assistance quantity.

2. The steering apparatus according to claim 1, wherein the steering controller sets the feedback quantity of the steering angular velocity coefficient setting unit when the steering angular velocity is in a predetermined low-frequency range to become larger than the feedback quantity of the torque coefficient setting unit when the torque is in a predetermined low-frequency range.

3. The steering apparatus according to claim 1 or 2, wherein the steering angular velocity coefficient setting unit includes a first amplifier that amplifies and outputs an input corresponding to the steering angular velocity which is the speed of the steering angle detected by the steering angle detector, a first filter that performs a low-pass filtering process of removing a predetermined high-frequency component of the output of the first amplifier and outputting the resultant as the steering angular velocity coefficient, and a first negative feedback circuit that constitutes the first negative feedback unit and that negatively feeds back the output of the first filter to the input of the first amplifier with a predetermined feedback quantity, and wherein the torque coefficient setting unit includes a second amplifier that amplifies and outputs an input corresponding to the torque detected by the torque detector, a second filter that performs a high-pass filtering process of removing a predetermined low-frequency component of the output of the second amplifier and outputting the resultant as the torque coefficient, and a second negative feedback circuit that constitutes the second negative feedback unit and that negatively feeds back the output of the second filter to the input of the second amplifier with a predetermined feedback quantity.

4. The steering apparatus according to claim 1, wherein the correction assistance quantity calculating unit calculates the correction assistance quantity on the basis of first steering power based on the steering angular velocity coefficient, the torque detected by the torque detector, and the steering angular velocity which is the speed of the steering angle detected by the steering angle detector and second steering power based on the torque coefficient, a differential value of the torque detected by the torque detector, and the steering angle detected by the steering angle detector.

5. The steering apparatus according to claim 4, wherein the first steering power is a value corresponding to a value obtained by dividing the product of the steering angular velocity coefficient, the torque detected by the torque detector, and the steering angular velocity which is the speed of the steering angle detected by the steering angle detector by the absolute value of the torque detected by the torque detector, and wherein the second steering power is a value corresponding to a value obtained by dividing the product of the torque coefficient, the differential value of the torque detected by the torque detector, and the steering angle detected by the steering angle detector by the absolute value of the steering angle detected by the steering angle detector.

6. A steering apparatus comprising:
a steering member that turns turning wheels of a vehicle;
an actuator that assists an operation on the steering member;
a steering angle detector that detects a steering angle of the steering member;
a torque detector that detects a torque acting on a steering shaft unit rotating along with the steering member; and
a steering controller that includes
a steering angular velocity coefficient setting unit that sets a steering angular velocity coefficient on the basis of a steering angular velocity which is a speed of the steering angle detected by the steering angle detector,
a torque coefficient setting unit that sets a torque coefficient on the basis of the torque detected by the torque detector and that sets the torque coefficient when the torque is in a predetermined high-frequency range to become larger than the steering angular velocity coefficient when the steering angular velocity is in a predetermined high-frequency range, and
a correction assistance quantity calculating unit that calculates the correction assistance quantity on the basis of the steering angular velocity coefficient and the torque coefficient,
wherein the steering controller controls the actuator on the basis of a basic assistance quantity which is an assistance quantity as a basis and the correction assistance quantity.

7. A steering apparatus comprising:
a steering member that turns turning wheels of a vehicle;
an actuator that assists an operation on the steering member;
a steering angle detector that detects a steering angle of the steering member;
a torque detector that detects a torque acting on a steering shaft unit rotating along with the steering member; and
a steering controller that includes
a steering angular velocity coefficient setting unit that includes a first amplifier that amplifies and outputs an input corresponding to the steering angular velocity which is the speed of the steering angle detected by the steering angle detector, a first filter that performs a low-pass filtering process of removing a predetermined high-frequency component of the output of the first amplifier and outputting the resultant as a steering angular velocity coefficient, and a first negative feedback circuit that negatively feeds back the output of the first filter to the input of the first amplifier, and that sets the steering angular velocity coefficient on the basis of a steering angular velocity which is a speed of the steering angle detected by the steering angle detector, a torque coefficient setting unit that includes a second amplifier that amplifies and outputs an input corresponding to the torque detected by the torque detector, a second filter that performs a high-pass filtering process of removing a predetermined low-frequency component of the output of the second amplifier and outputting the resultant as a torque coefficient, and a second negative feedback circuit that negatively feeds back the output of the second filter to the input of the second amplifier, and that sets the torque coefficient on the basis of the torque detected by the torque detector, and a correction assistance quantity calculating unit that calculates the correction assistance quantity on the basis of the steering angular velocity coefficient and the torque coefficient, wherein the steering controller controls the actuator on the basis of a basic assistance quantity which is an assistance quantity as a basis and the correction assistance quantity.

8. A steering apparatus comprising:

a steering member that turns turning wheels of a vehicle;

an actuator that assists an operation on the steering member; and a steering controller that includes a correction assistance quantity calculating unit that calculates an correction assistance quantity on the basis of a steering angular velocity coefficient determined depending on a steering angular velocity which is the speed of a steering angle of the steering member and a torque coefficient determined depending on a torque acting on a steering shaft unit rotating along with the steering member, a steering angular velocity coefficient setting unit that sets the steering angular velocity coefficient on the basis of the steering angular velocity, that includes a first negative feedback unit, and that sets the steering angular velocity coefficient for the steering angular velocity having the same magnitude to become larger as a feedback quantity of the first negative feedback unit becomes larger, and a torque coefficient setting unit that sets the torque coefficient on the basis of the torque acting on the steering shaft unit rotating along with the steering member, that includes a second negative feedback unit, that sets the torque coefficient for the torque having the same magnitude to become larger as a feedback quantity of the second negative feedback unit becomes larger, and that sets a feedback quantity of the torque coefficient setting unit when the torque acting on the steering shaft unit rotating along with the steering member is in a predetermined high-frequency range to become larger than a feedback quantity of the steering angular velocity coefficient setting unit when the steering angular velocity is in a predetermined high-frequency range, wherein the steering controller controls the actuator on the basis of a basic assistance quantity which is an assistance quantity as a basis and the correction assistance quantity.

* * * * *